(12) United States Patent
Neuner

(10) Patent No.: US 10,543,779 B2
(45) Date of Patent: Jan. 28, 2020

(54) MOLDED PART AND A METHOD FOR MANUFACTURING SUCH A MOLDED PART

(71) Applicant: NOVEM Car Interior Design GmbH, Vorbach (DE)

(72) Inventor: Tobias Neuner, Ahorntal (DE)

(73) Assignee: NOVEM Car Interior Design GmbH, Vorbach (DE)

( * ) Notice: Subject to any disclaimer, the term of this patent is extended or adjusted under 35 U.S.C. 154(b) by 0 days.

(21) Appl. No.: 16/109,588

(22) Filed: Aug. 22, 2018

(65) Prior Publication Data
US 2019/0061614 A1 Feb. 28, 2019

(30) Foreign Application Priority Data
Aug. 23, 2017 (DE) .......... 10 2017 119 292

(51) Int. Cl.
| | | |
|---|---|---|
| *B60Q 3/20* | (2017.01) | |
| *B60Q 3/54* | (2017.01) | |
| *B60R 13/02* | (2006.01) | |
| *B29L 31/30* | (2006.01) | |
| *B29C 45/14* | (2006.01) | |
| *B60Q 3/64* | (2017.01) | |

(52) U.S. Cl.
CPC .......... *B60Q 3/20* (2017.02); *B29C 45/14508* (2013.01); *B60Q 3/54* (2017.02); *B60Q 3/64* (2017.02); *B60R 13/02* (2013.01); *B60R 13/0237* (2013.01); *B29C 45/14688* (2013.01); *B29C 2045/1486* (2013.01); *B29K 2995/0026* (2013.01); *B29K 2995/0029* (2013.01); *B29L 2031/3008* (2013.01); *B60Q 2500/10* (2013.01); *B60R 2013/0287* (2013.01)

(58) Field of Classification Search
None
See application file for complete search history.

(56) References Cited

U.S. PATENT DOCUMENTS

| | | | |
|---|---|---|---|
| 2009/0129107 A1* | 5/2009 | Egerer .................... | B60R 13/02 362/509 |
| 2018/0022294 A1* | 1/2018 | Haas ........................ | B60Q 3/54 362/511 |

FOREIGN PATENT DOCUMENTS

| | | |
|---|---|---|
| DE | 102009031820 | 2/2010 |
| DE | 102015120120 | 5/2017 |

* cited by examiner

*Primary Examiner* — Ashok Patel
(74) *Attorney, Agent, or Firm* — Workman Nydegger

(57) ABSTRACT

A molded part can comprise a backing and a decorative layer. The decorative layer has a back side facing the backing and a visible front side. A transparent or translucent layer is provided on the front side of the decorative layer, with a light source being provided about the molded part. An optical fiber can be connected to the light source on the visible, front side of the decorative layer. The optical fiber(s) can run parallel to the front side of the decorative layer in one or more grooves in at least some sections on the front side of the decorative layer. The optical fiber(s) may be formed by a transparent or translucent filler material introduced into the groove(s), the refractive index of the filler material being greater than the refractive index of the high-gloss layer. Implementations further include a method of making the same.

16 Claims, 2 Drawing Sheets

MOLDED PART AND A METHOD FOR MANUFACTURING SUCH A MOLDED PART

CROSS-REFERENCE TO RELATED APPLICATIONS

The present invention claims the benefit of priority to German Patent Application No. 10 2017 119 292.1, filed Aug. 23, 2017, the entire content of which is incorporated herein by reference.

BACKGROUND OF THE INVENTION

1. The Field of the Invention

The invention relates to a molded part, in particular a decorative part and/or a paneling part designed as a molded part for an automotive interior according to the preamble of claim 1 and a method for manufacturing such a molded part.

2. Background and Relevant Art

The requirement of achieving light effects on the front side of the molded part, for example, by means of sidelight fibers is made of such molded parts. However, the aforementioned sidelight fibers, which are used as optical fibers, also have some disadvantages. For example, a homogenous and efficient light output over long distances is possible only to a limited extent or not at all. Furthermore, it is difficult to prevent damage to the sidelight fibers and the subsequent negative effect on the light output when the sidelight fibers are introduced and therefore it is extremely expensive to manufacture such a molded part.

BRIEF SUMMARY OF THE INVENTION

The object of the present invention is thus to provide a novel molded part, in particular a molded part which will yield an alternative solution for use of sidelight fibers. Furthermore, the object of the invention is to provide a novel method for manufacturing such a molded part.

This object is achieved by the features of claim 1 with regard to the molded part and by the features of claim 10 with regard to the method for manufacturing such a molded part. Advantageous embodiments and refinements are defined in the respective dependent claims.

The molded part according to the invention comprises a backing, in particular a plastic backing and a decorative layer, in particular a wood veneer or an aluminum layer or a fabric. The decorative layer has a back side facing the backing and a front side, which is designed as the visible side, wherein a transparent or translucent high-gloss layer, preferably made of PUR or PMMA, is provided on the front side of the decorative layer. Furthermore, at least one light source, in particular a laser or an LED, is provided as a light source on or in the molded part. In addition, one or more optical fibers connected to the light source are provided on the front side of the decorative layer, which is embodied as the visible side, wherein the optical fiber(s) run(s) parallel to the front side of the decorative layer in one or more of the grooves provided to receive the optical fiber(s) in the front side of the decorative layer in at least some sections. According to the invention, it is provided that the optical fiber(s) is (are) formed by a transparent or translucent filler material, which is cast or otherwise introduced into the groove(s), wherein the refractive index of the filler material is greater than the refractive index of the high-gloss layer.

With the molded part according to the invention, light is preferably directed through the optical fiber formed by the filler material, based on the principle of total reflection.

The optical fiber(s) is (are) provided in the molded part according to the invention in particular to emit light on the front side of the decorative layer, which is embodied as the visible side, to create a light accent in the form of lines or waves, for example, or also to represent a symbol.

The advantages of the invention lie in particular in the fact that form-following illuminated line designs, so-called "flowing lines," can be represented on the front side of the decorative layer.

Additional advantages of the molded part according to the invention consist of the fact that no additional 3D-shaped optical fiber area is necessary on the back side of the molded part. Furthermore, no side-emitting light fibers are necessary. In addition, only one or a few LEDs are necessary as the light source.

According to a refinement of the invention, an additional layer is provided on the bottom surface and/or the side surfaces of the groove(s).

The additional layer is preferably designed to be reflective. Alternatively or additionally, the refractive index of the additional layer is lower than the refractive index of the filler material of the optical fiber(s).

For example, the additional layer is a paint layer, preferably white or silver in color, the paint layer preferably being produced by spray painting.

It is possible to provide for the optical fibers to have an output structure on their front side facing the visible side in at least some sections, wherein the output structure is formed by a second surface roughness of the filler material in the area of the output structure, which is different from the surface roughness of the additional filler material.

According to one embodiment variant of the invention, it is provided that the filler comprises a cement, for example, PUR, or is made of cement, for example, PUR.

A refinement of the invention provides that at least one light source is provided on the back side of the molded part or in a recess in the backing or at the side of the molded part, wherein the light source is connected to the optical fibers for input of light into the optical fiber by means of additional optical fibers, for example.

It is possible to provide for the groove(s) to preferably extend orthogonally to the front side of the decorative layer, into the decorative layer or completely through the decorative layer, in particular into the backing in its/their depth extent.

Furthermore, it is possible to provide for the groove(s) to be designed with a semicircular or parabolic or rectangular cross section.

The method according to the invention for producing a molded part according to one of the preceding claims comprises the steps: supplying a material that is provided to form the decorative layer of the molded part, back injection of the material provided to form the decorative layer by injection molding using a backing material, in particular a plastic to form the backing, forming at least one or a plurality of grooves on the front side of the decorative layer, casting a filler material into the groove(s) to form one or more optical fibers, overmolding on the decorative layer and the optical fiber(s) with a high-gloss layer.

A refinement of the method according to the invention provides that an additional layer is provided on the bottom surface and/or the side surfaces of the groove(s), wherein the additional layer is preferably painted or sprayed with a spray paint.

The groove(s) is (are) preferably milled or lasered on the front side of the decorative layer or embossed, preferably by the upper mold of an injection mold.

An expedient and advantageous refinement of the method provides that an output structure is provided in at least some sections on the front side of the optical fiber(s) facing the visible side, wherein the output structure is created by a surface treatment, for example, by laser structuring of the filler material.

BRIEF DESCRIPTION OF THE DRAWINGS

The invention will also be explained below with regard to additional features and advantages on the basis of the description of exemplary embodiments and with reference to the accompanying schematic diagrams in which.

Corresponding parts and components, even beyond the various exemplary embodiments, are each labeled with the same reference numerals.

DETAILED DESCRIPTION OF THE PREFERRED EMBODIMENTS

Figure 1:
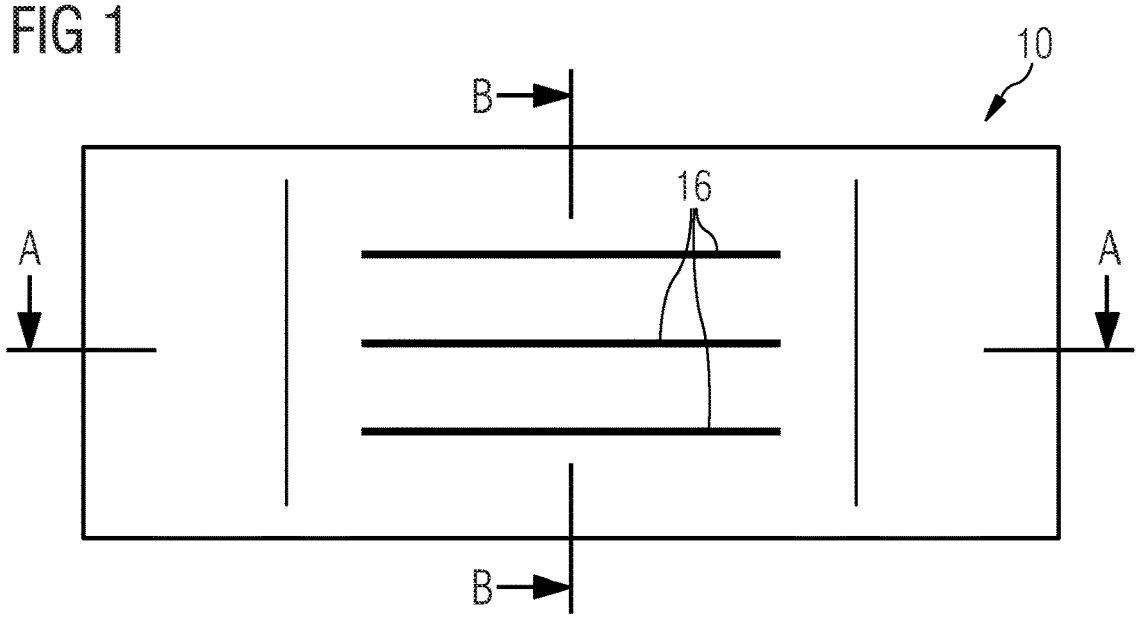
FIG. 1 shows a schematic diagram of a top view of a first exemplary embodiment of a molded part according to the invention.
Figure 2:
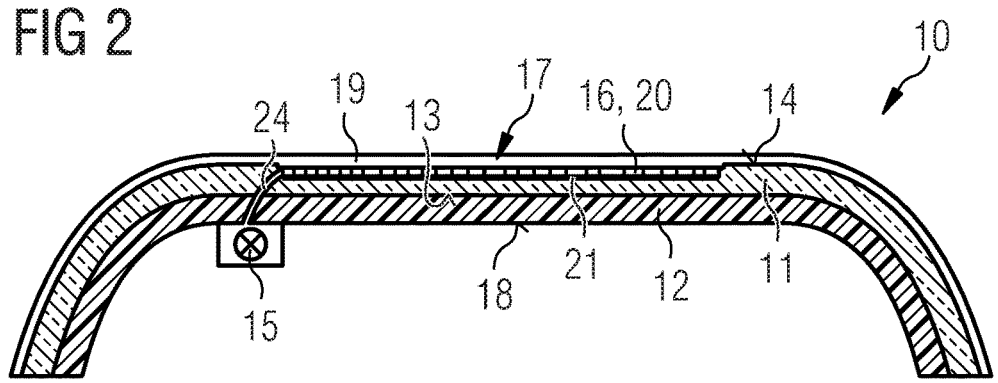
FIG. 2 shows a schematic cross-sectional diagram of a second exemplary embodiment of a molded part according to the invention, for example, along a sectional plane, as illustrated by sectional line A in FIG. 1.
Figure 3:
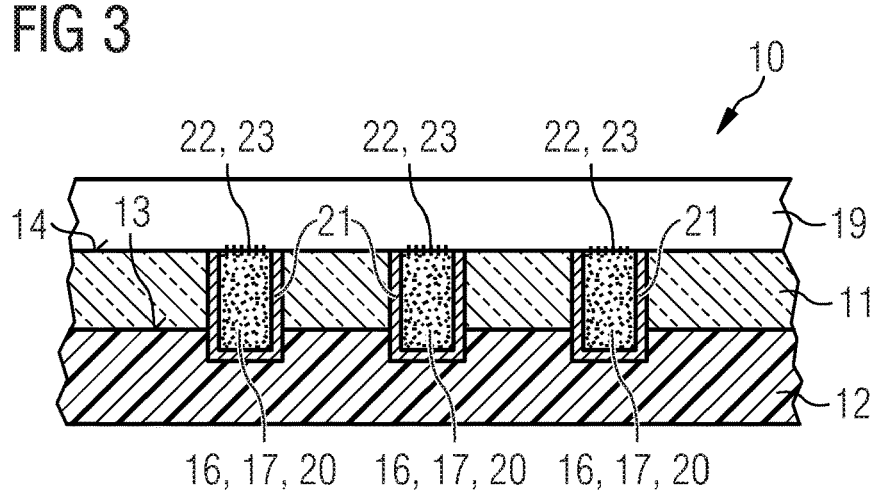
FIG. 3 shows a schematic cross-sectional diagram of a third exemplary embodiment of a molded part according to the invention, for example, along a sectional plane like that shown in FIG. 1, through the sectional line B.

FIG. 1 to FIG. 3 show a decorative part and/or a paneling part designed as a molded part 10 for the automotive interior. Molded part 10 comprises a backing 12 made of plastic and a wooden veneer as a decorative layer 11.

The decorative layer 11 has a back side 13 facing the backing 12 and a front side 14 designed as the visible side, wherein a transparent or translucent high-gloss layer 19 of PUR is provided on the front side 14 of the decorative layer 11.

Furthermore, an LED is provided as the light source 15 on the molded part 10. The light source 15 is provided on the back side 18 of the molded part 10 and is connected to the optical fibers 16 by additional optical fibers 24 for input of light into the optical fibers 16.

Figure 4:
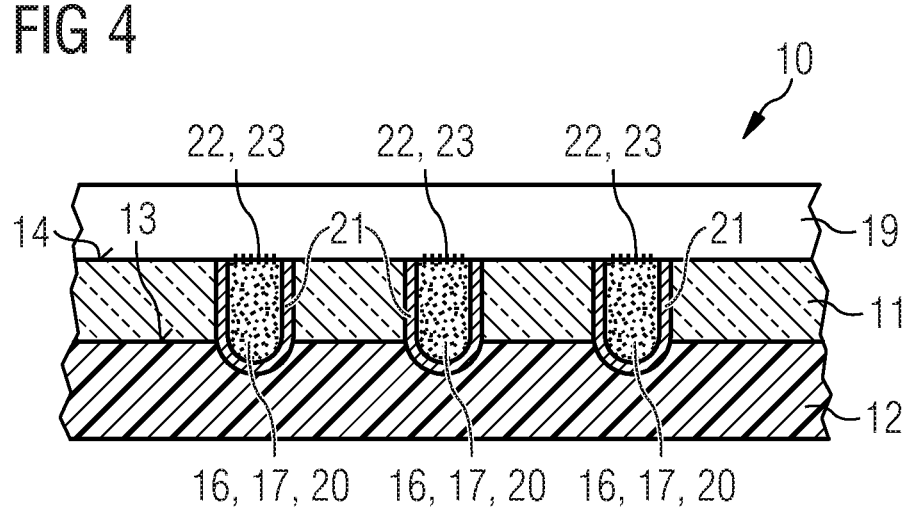
FIG. 4 shows a semicircular cross section of the grooves shown in FIGS. 2-3.
Figure 5:
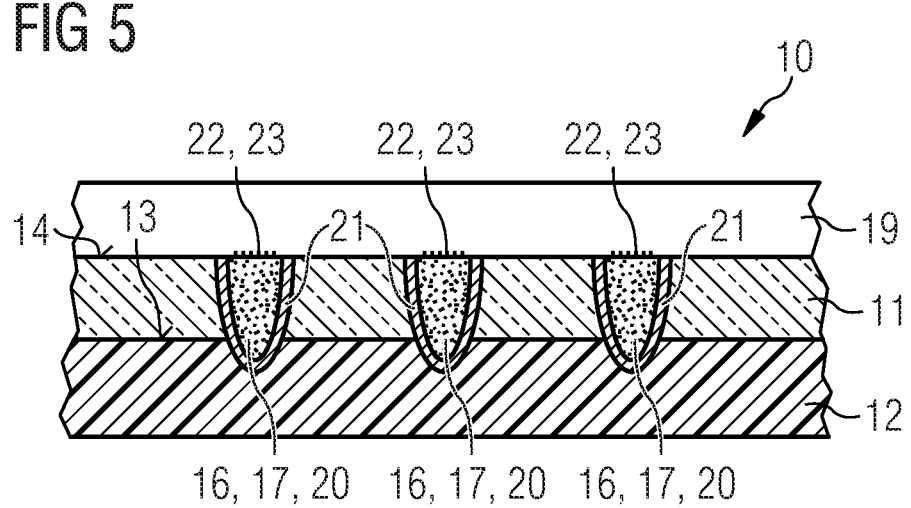
FIG. 5 shows a parabolic cross section of the grooves shown in FIGS. 2-3.

Three optical fibers 16, which are connected to the light source 15, are provided on the front side 14 of the decorative layer 11, which is designed as the visible side. The optical fibers 16 run parallel to the front side 14 of the decorative layer 11 in three grooves 17 that are provided to receive the optical fibers 16 in the front side 14 of the decorative layer 11. The grooves 17 extend completely through the decorative layer 11 into the backing 12 orthogonally to the front side 14 of the decorative layer 11, and are designed with a rectangular cross section. (FIGS. 4 and 5 show that the grooves 17 can alternately be designed with a semi-circular or parabolic cross-section, respectively.) The grooves 17 may be milled or lasered into the front side 14 of the decorative layer 11.

The optical fibers 16 are formed by a transparent or translucent filler material 20, which is cast into the grooves 17, wherein the refractive index of the filler material 20 is greater than the refractive index of the high-gloss layer 19. The filler material 20 is cement.

Furthermore, an additional layer 21 is provided on the bottom surface and on the side surfaces of the grooves 17. The additional layer 21 is designed to be reflective, with the refractive index of the additional layer 21 being lower than the refractive index of the filler material 20 of the optical fibers 16. The additional layer 21 is a white or silver paint layer applied by spray painting.

The optical fibers 16 have an output structure 23 in at least some sections on their front side 22 facing the visible side, wherein the output structure 23 is formed by a second surface roughness of the filler material 20, which is different from the surface roughness of the filler material 20. The output structure 23 is formed by surface treatment, for example, laser structuring of the filler material 20.

LIST OF REFERENCE NUMBERS 10 molded part
11 decorative layer
12 backing
13 back side
14 front side
15 light source
16 optical fiber
17 groove
18 back side of molded part
19 high-gloss layer
20 filler material
21 additional layer
22 front side
23 output structure
24 optical fiber
A line of intersection
B line of intersection

I claim:

1. A molded part, comprising:
a backing and a decorative layer;
wherein the decorative layer has a back side facing the backing and a front side designed as a visible side;
wherein a transparent or translucent high-gloss layer is provided on the front side of the decorative layer;
wherein at least one light source is provided in or on the molded part;
wherein one or more optical fibers connected to the light source are provided on the front side of the decorative layer, which is designed as a visible side, wherein the optical fiber(s) run parallel to the front side of the decorative layer in one or more grooves provided to receive the optical fiber(s) in at least some sections in the front side of the decorative layer;
wherein the one or more optical fibers are formed by a transparent or translucent filler material introduced into or cast in the one or more groove;
wherein a refractive index of the filler material is greater than a refractive index of the high-gloss layer.

2. The molded part according to claim 1, wherein an additional layer is provided on one or both of a bottom surface and the side surfaces of the one or more grooves.

3. The molded part according to claim 2, wherein:
the additional layer is designed to be reflective.

4. The molded part according to claim 2, wherein the additional layer is a paint layer.

5. The molded part according to claim 2, wherein the refractive index of the additional layer is lower than the refractive index of the filler material of the one or more optical fibers.

6. The molded part according to claim 1, wherein the filler material comprises cement or is formed by cement.

7. The molded part according to claim 1, wherein the at least one light source is provided:
on the back side of the molded part; or
in a recess in the backing; or
on a side of the molded part.

8. The molded part according to claim 1, wherein:
the one or more grooves extend into the decorative layer or completely through the decorative layer.

9. The molded part according to claim 1, wherein
the one or more grooves are designed to have a semicircular cross section, a parabolic cross section, or a rectangular cross section.

10. The molded part according to claim 1, wherein:
the one or more optical fiber(s) have an output structure on the front side facing the visible side; and
the output structure is formed by a second surface roughness of the filler material, which is different from the surface roughness of an additional filler material in the area of the output structure.

11. A molded part, comprising:
a backing and a decorative layer;
wherein the decorative layer has a back side facing the backing and a front side designed as a visible side;
wherein a transparent or translucent high-gloss layer is provided on the front side of the decorative layer;
wherein at least one light source is provided in or on the molded part;
wherein one or more optical fibers connected to the light source are provided on the front side of the decorative layer, which is designed as a visible side, wherein the optical fiber(s) run parallel to the front side of the decorative layer in one or more grooves provided to receive the optical fiber(s) in at least some sections in the front side of the decorative layer;
wherein the one or more optical fibers are formed by a transparent or translucent filler material introduced into or cast in the one or more groove;
wherein a refractive index of the filler material is greater than a refractive index of the high-gloss layer;
wherein an additional layer is provided on one or both of a bottom surface and the side surfaces of the one or more grooves.

12. The molded part according to claim 11, wherein:
the one or more optical fiber(s) have an output structure on the front side facing the visible side; and
the output structure is formed by a second surface roughness of the filler material, which is different from the surface roughness of an additional filler material in the area of the output structure.

13. The molded part according to claim 11, wherein the filler material comprises cement or is formed by cement.

14. The molded part according to claim 11, wherein the at least one light source is provided:
on the back side of the molded part; or
in a recess in the backing; or
on a side of the molded part.

15. The molded part according to claim 11, wherein:
the one or more grooves extend into the decorative layer or completely through the decorative layer.

16. The molded part according to claim 11, wherein
the one or more grooves are designed to have a semicircular cross section, a parabolic cross section, or a rectangular cross section.

* * * * *